United States Patent [19]

Fisch

[11] Patent Number: 4,615,861

[45] Date of Patent: Oct. 7, 1986

[54] OSCILLATORY NONHMIC CURRENT DRIVE FOR MAINTAINING A PLASMA CURRENT

[75] Inventor: Nathaniel J. Fisch, Princeton, N.J.

[73] Assignee: The United States of America as represented by the United States Department of Energy, Washington, D.C.

[21] Appl. No.: 477,700

[22] Filed: Mar. 22, 1983

[51] Int. Cl.[4] .............................................. G21B 1/00
[52] U.S. Cl. .................................................. 376/133
[58] Field of Search ............... 376/107, 123, 124, 132, 376/133, 915

[56] References Cited

U.S. PATENT DOCUMENTS

| | | | |
|---|---|---|---|
| 3,170,841 | 2/1965 | Post | 376/128 |
| 4,057,462 | 11/1977 | Jassby et al. | 376/124 |
| 4,065,351 | 12/1977 | Jassby et al. | 376/107 |
| 4,292,124 | 9/1981 | Fisch . | |
| 4,416,845 | 11/1983 | Salisbury | 376/107 |
| 4,423,001 | 12/1983 | Fisch | 376/123 |

OTHER PUBLICATIONS

Grisham et al., A Nuclear Diagnostic for Fast Alpha Particles, PPPL-1962, Dec. 1982.
Ehst et al., "Relativistic Electron Beam Current Drive for Tokomak Reactors," *Bulletin of the American Physical Society*, vol. 26, No. 7, p. 965, Oct. 1981.
N. J. Fisch, "Current Generation in Toroidal Plasma", presented at the Proceedings of the Third Joint Grenoble-Varenna International Symposium on Heating in Toroidal Plasmas, Grenoble, France, Mar. 22-27, 1982.
N. J. Fisch, "Operating Tokomaks with Steady-State Toroidal Current," *Proceedings of the Fourth Topical Conference on Radio Frequency Plasma Heating*, Austin, Texas, Feb., 1981.
Tiger et al., "SLPX-I Superconducting Long-Pulse Experiment", PPPLR No.-1500, pp. 3-22, 1978.
Weaver et al., Exotic CTR Fuels for Direct Conversion-Utilizing Fusion Reactors, LLL, Mar. 16, 1973.

*Primary Examiner*—Deborah L. Kyle
*Assistant Examiner*—Richard W. Wendtland
*Attorney, Agent, or Firm*—Bruce R. Mansfield; Paul A. Gottlieb; Judson R. Hightower

[57] ABSTRACT

Apparatus and method of the invention maintain a plasma current with an oscillatory nonohmic current drive. Each cycle of operation has a generation period in which current driving energy is applied to the plasma, and a relaxation period in which current driving energy is removed. Plasma parameters, such as plasma temperature or plasma average ionic charge state, are modified during the generation period so as to oscillate plasma resistivity in synchronism with the application of current driving energy. The invention improves overall current drive efficiencies.

22 Claims, 2 Drawing Figures

OSCILLATORY NONHMIC CURRENT DRIVE FOR MAINTAINING A PLASMA CURRENT

CONTRACTUAL ORIGIN OF THE INVENTION

The United States Government has rights in this invention pursuant to Contract No. DE-AC02-76CH03073 between the U.S. Department of Energy and the Princeton University.

BACKGROUND OF THE INVENTION

This invention pertains to systems for maintaining plasma currents in toroidal magnetic confinement devices, and in particular to such systems pertaining to plasma currents of the pulsed nonohmic type.

Operation of Tokamaks and the like toroidal magnetic confinement fusion devices may be classified as having either ohmic or non-ohmic current drive, and as having either continuous or pulsed modes of operation. Practical reactor designs favor the non-ohmic current drive in that ohmic or transformer-driven plasma currents must of necessity operate in a pulsed mode. Steady state (continuous) operation, or as a practical approximation, a very long pulse operation (at least several hours or days), is regarded as essential if fusion reactors are to become an economic reality. Long pulse operation is favored because it limits the metal fatique of structural components arising from the heat stresses inherent in short-pulse devices. A variety of non-ohmic methods have been proposed to drive steady-state toroidal currents in Tokamaks. The most promising methods include current-drive by neutral beams and by radio-frequency waves in three frequency regimes: the lower-hybrid (LHW), the electron-cyclotron (ECRF), and the ion-cyclotron (ICRF) regimes.

While the totally steady state tokamak is, perhaps, most desirable, there are advantages to partly steady state tokamaks. The term "totally steady state" implies that no plasma parameters vary with time. The term "partly steady state" implies that the plasma current is nearly constant, but other parameters may vary. Many advantages of totally steady operation accrue to the partly steady operation; since the tokamak does continuously confine hot plasma, the aforementioned heat stresses will not be as severe as in pulsed operation. Also, there are geometrical advantages arising from avoiding the use of ohmic coils and since the current is nearly constant, refrigeration costs of the superconducting toroidal coils are less than in pulsed operation.

Current generation techniques for operation in partly steady state devices are described herein. These devices are of practical interest since they require less circulating power than a completely steady-state mode of current-drive operation. There is a continuous effort in the art to reduce the average power requirements in toroidal magnetic confinement systems. Recent investigation of rf current-drives has focused upon the ratio of current generated to power dissipated, $J/P_d$, which is a measure of the steady-state efficiency.

It is therefore an object of the present invention to further improve pulsed nonohmic current drive efficiencies in partly steady-state devices.

It is another object of the present invention to provide a system of steady-state toroidal electric currents in the plasma of a fusion device serving to confine the plasma.

It is another object of the present invention to provide a method of oscillating selected plasma parameters in synchronism with the application of a pulsed nonohmic current-drive.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is directed to a current drive for toroidal plasma devices which is composed of two stages: a generation period and a relaxation period. The present invention modifies (oscillates) selected plasma parameters (which affect either the ohmic or the preferred nonohmic current-drive) during the generation period, when, for example, lower plasma densities require higher nonohmic drive efficiencies. The plasma parameters are oscillated in synchronism with the application of pulsed nonohmic current drive energization. During the relaxation period, when the current generating power is not absorbed, the driven current continues to flow in the now high-density plasma, for example, when fusion power output is higher. According to the invention, plasma resistivity is increased, along with an optional lowering of plasma density, n, through a decrease in plasma temperature T, and/or an increase in the average ion charge state, $Z_{eff}$. These techniques assume that a plasma-current has been generated, and that only a means for maintaining the plasma current is required. After the plasma current has been established in the generation period, the current is then allowed to decay in a relaxation period wherein the selected plasma parameters assume values that are optimal from other considerations, such as fusion energy production.

The invention increases $<J/P_d>$, the ratio of the overall toroidal current generated, to the power dissipated in sustaining the current. The angle brackets indicate that this is an average quantity, where the average has been taken over the full cycle of generation and relaxation. As will be explained more fully below, the invention increases $<J/P_d>$, in part, by reducing $\tau_g$, the L/R time constant of the toroidal plasma during the generation period (wherein L and R are plasma inductance and plasma resistivity, respectively). More specifically, the parameter $\tau_g$ is minimized by increasing the plasma resistivity during the generation period. The plasma resistivity is proportional to the product of $Z_{eff}$ and $T-3/2$. Thus, increasing the average ionic charge state $Z_{eff}$ or decreasing the plasma temperature T accomplishes the increase in resistivity and the lowering of $\tau_g$.

In addition to a lower power dissipation, this invention further provides a modification of plasma parameters so as to enable operation of some mechanisms of nonohmic current-drive in the plasma interior. For example, both neutral beams and lower hybrid waves penetrate more easily if the plasma has a lowered density and lowered temperature.

DETAILED DESCRIPTION OF THE PREFERRED EMBODIMENT

This invention improves nonohmic current drive efficiencies in toroidal plasma devices, such as tokamaks (the best known example) as well as stellarators, levitrons, and floating-ring multipoles. As will be explained more fully below, the invention oscillates selected plasma parameters in synchronism with nonohmic current drive energization pulses, as timed by control unit 2.

Figure 1:
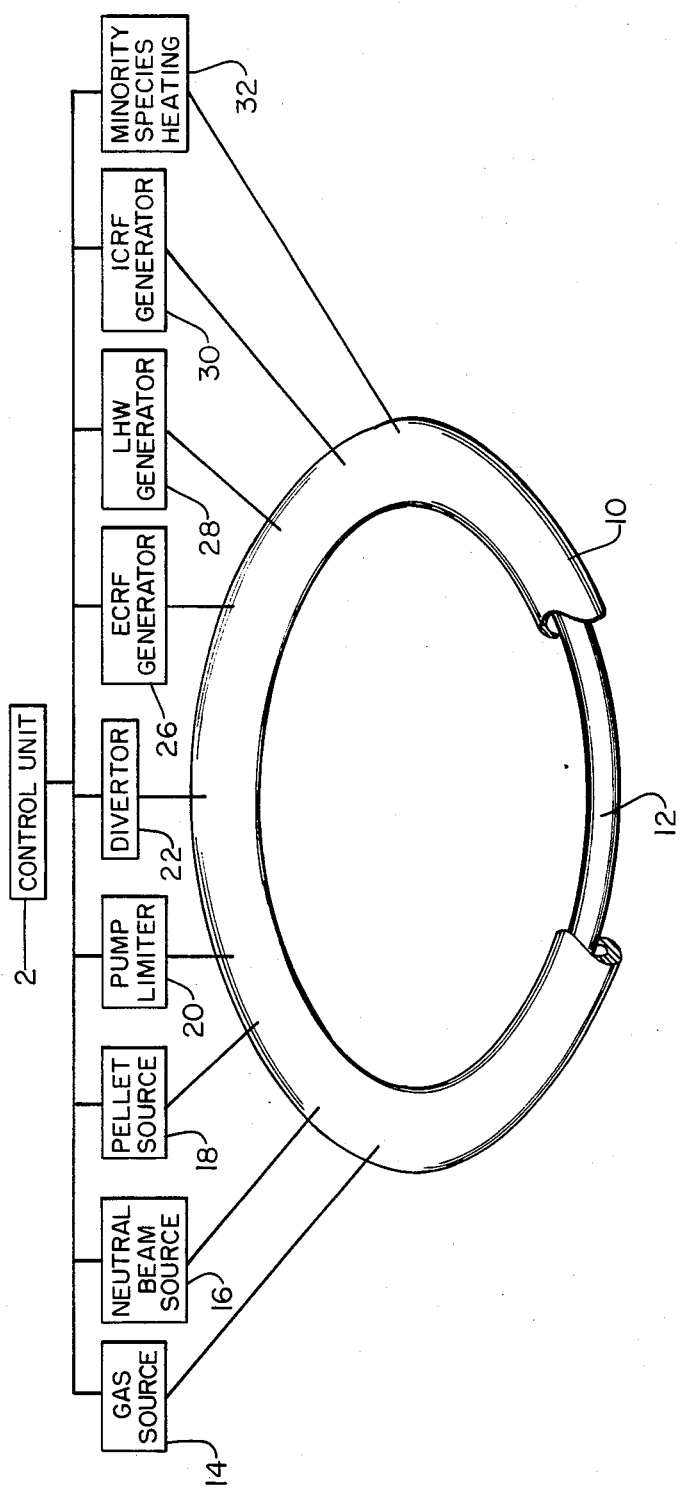
FIG. 1 is a schematic diagram of a toroidal plasma device and a current drive system according to the invention.

Referring now to FIG. 1, fuel and other matter is introduced in a toroidal plasma device 10 in either a gaseous or a solid state to produce and maintain a toroidal plasma column 12. Method of introducing matter in the gaseous state include gas-puffing, utilizing a conventional gas source 14, and neutral beam techniques, which utilize a conventional neutral beam source 16. In the solid state, matter may be injected in the form of frozen pellets via conventional pellet source 18. Matter is also removed from the plasma devices by either pump limiters 20 or divertors 22. Plasma density is increased when the injection rates exceed the removal rates. Similarly, plasma density is lowered when the rate of injection into the device falls short of the removal rate. Thus, controlling the gas puffing or frozen pellet injection rates, as well as the pump limiter or divertor removal rates, allows control of plasma density, as is known in the art.

While the present invention employs conventional nonohmic steady state current drive techniques via neutral beam injector 16, electron cyclotron resonant frequency (ECRF) generator 26, lower hybrid wave (LHW) generator 28, or ion cyclotron resonant frequency (ICRF) generator 30, toroidal currents are now generated in a purposefully polluted, degraded or substandard plasma, which was heretofore undesirable. Previous attempts to generate plasma current assumed that clean or otherwise "optimum" plasmas were to be preferred.

Attempts have been made in the literature to vary plasma (i.e. heretofore "optimum" plasma) density and current generation in a cyclic fashion. Originally, this was thought to be advantageous, because neutral beams could better penetrate an underdense plasma. As recognized in the Princeton Plasma Physics Lab Report PPL-1500, by P. H. Tiger et al, pp 3–22, 1978, (hereinafter Tiger et al, 1978) the neutral beam power requirements would be less. Later, it was recognized that cyclic density operating techniques were applicable in general to all nonohmic current drives, and a general theory was developed for reducing the average power requirements, as set forth in the Proceedings of the Fourth Topical Conference on Radio Frequency Plasma Heating, by N. J. Fisch, inventor of the present invention, Austin, Tex., February, 1981 (hereinafter N. J. Fisch, Austin, 1981).

While the present invention may employ cyclic density techniques, these are independent options to novel techniques for varying plasma resistivity, which are set forth herein. Plasma resistivity is not dependent on plasma density, but rather depends on the temperature and average ionic charge state of the plasma, and techniques for varying these parameters, in synchronism with the application of a pulsed nonohmic current drive form the present invention. The overall system and method of the present invention is distinguished over prior techniques in that deliberate polluting, cooling, or other degradation of the plasma is employed so as to increase plasma resistivity during current-generation, over plasma resistivity during current relaxation. It is understood that plasma density during current generation and relaxation periods may differ, especially where lower plasma density conditions are experienced during periods of current generation.

The following will be described with reference to a tokamak confinement device, although it will be appreciated by those skilled in the art that the invention can be used with toroidal confinement devices other than tokamaks. It is well known that a tokamak plasma confinement device will resist change in the value of its toroidal current for an electrical time constant or so-called "L/R" time, where L is the plasma inductance and R is the plasma resistivity. In an rf (or other nonohmic) toroidal current, the nonohmic current, $J_{rf}$, is generated inside the torus, so that the total toroidal current J will satisfy the following equation.

$$\frac{dJ}{dt} + \frac{J}{\tau_g} = \frac{J_{rf}}{\tau_g}, \quad (1)$$

where $\tau_g = L/R$. For constant $J_{rf}$, the steady state (wherein $J = J_{rf}$) will be established in the characteristic time $\tau_g$. As set forth in an article entitled "Current Generation in Toroidal Plasma" by N. J. Fisch, inventor of the present invention (presented at the Third Joint Grenoble-Varenna International Symposium on Heating in Toroidal Plasmas, Grenoble, France, Mar. 22–27, 1982, hereinafter Fisch (1982) Grenoble, it is assumed that the rf current may appear instantaneously. Most rf current-drive techniques generate current on a collisional time scale, which is far shorter than an L/R time for reactor parameters.

A two-cycle approach will be considered, wherein a current generation cycle of duration $T_g$ alternates with a current relaxation cycle of duration $T_r$. The current generation cycle is marked by a source of nonohmic current, $J_{rf}$, so that the total toroidal current obeys Eq. (1). The relaxation cycle is marked by the absence of an external source so that J obeys the following relation $$\frac{dJ}{dt} + \frac{J}{\tau_r} = 0, \quad (2)$$

where $\tau_r$, the L/R time during the relaxation cycle, is different from $\tau_g$, the L/R time during the generation cycle.

Power $P_d$ is absorbed from the current drive power source during the generation cycle, when it may be written as $$P_d = \left(\frac{P_d}{J}\right)_g J_{rf} - EJ_{rf}, \quad (3)$$

where $(P_d/J)_g$ is the usual ratio of power to current that occurs by virtue of collisions in the steady state, i.e. when $E = 0$. The subscript "g" indicates that the referenced quantity is to be evaluated consistent with parameters characteristic of the generation phase. The electric field E obeys Ohm's law $$E = \eta(J - J_{rf}), \quad (4)$$

where $\eta$ is the Spitzer parallel resistivity during the generation cycle. Using Eqs. (1)–(4), and assuming a constant $J_{rf}$ during the generation cycle, it is possible to find exactly the average $J/P_d$ defined by $$\frac{J}{P_d} = \frac{T_g + \int_0^{T_r} J dt}{\int_0^{T_g} P_d dt} = \frac{T_g J_{rf} + (\tau_r - \tau_g)(J_g - J_o)}{(P_d/J)_g T_g J_{rf} + \eta \tau_g J_{rf}(J_g - J_o)}, \quad (5)$$

wherein $J_g$ is defined to be $J(T_g)$, $J_o$ is defined to be $J(0)$, wherein, using the periodicity condition, $J(T_g+T_r)=J(0)$. In the absence of oscillating any parameters, $J_g=J_o$, corresponding to $T_r=0$, whereupon Eq. (5) indicates that $<J/P_d> = (J/P_d)_g$, as usual.

According to the invention, current generation is to be performed in a time much shorter than the L/R time, i.e. $T_g << \tau_g$, so that the following approximation holds true:

$$J_g - J_o \simeq (J_{rf} - J_o) T_g / \tau_g. \quad (6)$$

For reactor parameters, the Spitzer resistivity is exceedingly small compared to the equivalent rf resistivity, so that $\eta$ approaches 0 in Eq. (5). Substituting Eq. (6) into Eq. (5), $$\left\{ \frac{J}{P_d} \right\} = \left( \frac{J}{P_d} \right)_g \left[ 1 + \left( \frac{\tau_r - \tau_g}{\tau_g} \right) \left( \frac{J_{rf} - J_o}{J_{rf}} \right) \right]. \quad (7)$$

In light of Eq. (7), it can be seen that various procedures to maximize the efficiency by oscillating parameters are of interest. For example, even if $\tau_r = \tau_g$, then average current drive efficiency is just that efficiency attained during the generation cycle. However, the current is sustained also over the relaxation cycle when the plasma could have very different properties. This is the principle behind density oscillation techniques. Further elaboration is found in Tiger et al, (1978) pp 3–22, and in N. J. Fisch, Austin, Tex., 1981. Since nonohmic current drive attains higher efficiency in a low density plasma, while the fusion power output is larger in a high density plasma, the current is driven during the low density phase, and then allowed to relax during a subsequent high density phase. Since the plasma L/R time is independent of density, $\tau_g = \tau_r$. This method was described by N. J. Fisch, the inventor of the present invention, in N. J. Fisch, Austin, 1981. The present invention differs in that plasma resistivity is oscillated (in a variety of ways) in synchronism with the pulsed nonohmic current drive.

It is possible to obtain even higher average efficiency when $\tau_r > \tau_g$ with the simultaneous satisfaction of the overdrive condition $J_{rf} > J_o$. If the latter condition is well satisfied, i.e. $J_{rf} >> J_o$, then $$\left\{ \frac{J}{P_d} \right\} \simeq \left( \frac{J}{P_d} \right)_g \frac{\tau_r}{\tau_g}, \quad (8)$$

which emphasizes that an enhancement in average efficiency by the ratio $\tau_r/\tau_g$ may be obtained. It is assumed that the relaxation cycle is far longer than the generation cycle (both being shorter than an L/R time), and that the plasma parameters are optimized for the relaxation cycle. There remains the freedom, however, to change these plasma parameters in any toroidal device during the generation cycle, for example, by introducing or removing particles (which can be done very quickly since the particle containment time, $\tau_c$, is very short compared to the L/R time for reactor conditions). The parameter $\tau_g$ may be minimized by increasing the resistivity during the generation cycle. This has the beneficial effect, which is reflected in Eq. (8), of impeding the reverse ohmic current when the rf current is turned on. Care must be taken, however, that this increase in resistivity does not also hamper the nonohmic current drive.

Consider, for example, an inappropriate method that incorporates a decrease of $\tau_g$ by increasing $Z_{eff}$ during the generation cycle, i.e. polluting a pure hydrogen plasma would decrease $\tau_g$ by the factor $Z_{eff}$, the effective ion charge state during the pollution. If the nonohmic means of current drive is of the slow phase-velocity Alfven wave electron heating type, then $(J/P_d)_g$ will decrease by the same ratio and no advantage will have been realized. But, as will be explained below, use of electron cyclotron or lower hybrid waves will provide a significant advantage, underscoring that careful selection of the nonohmic current-drive is a crucial and nonobvious aspect of the present invention.

There are other means of controlling plasma resistivity and hence, the plasma parameter $\tau_g$. The electron temperature or more generally, the electron distribution function (especially during nonohmic current drive) may naturally exhibit two-temperature features if hot electrons are created. Enhancement of the resistivity may also be accomplished through collisionless means, wherein large return currents might induce ion-acoustic turbulence, although this is unlikely for realistic parameters. It has been thought, perhaps erroneously, that plasma turbulence itself could be helpful. On this basis, it has been suggested that intense pulsed relativistic electron beams might experience a higher average efficiency. D. A. Ehst et al, Relativistic Electron Beam Current Drive for Tokamak Reactors, Bulletin of the American Physical Society, Vol. 26, No. 7, p 965, October 1981. This article sets forth a conjecture that a relativistic electron beam will be an efficient current driver because of beam-induced plasma turbulence, which tends to slow down the beam and is therefore referred to as increasing plasma resistivity. Apart from the serious objections to this method on purely scientific grounds that it will not operate as conjectured, this method does not relate to any of the techniques of the present invention. Rather, in the present invention, the plasma itself is degraded so that the resistivity of the plasma to ohmic currents is directly enhanced. This is done through a modification of the parameters that affect the resistivity to purely ohmic currents, namely the average ion charge state and the plasma temperature.

According to the invention, nonohmic methods are advantageously employed to oscillate plasma resistivity by increasing $Z_{eff}$ during the generation cycle. (Other approaches according to the invention will follow the discussion regarding oscillating $Z_{eff}$).

In general, to control the effective ion charge state, one changes the matter injected into a plasma device. For example, to increase the ion charge state, instead of injecting frozen pellets of hydrogen, one may inject frozen pellets of neon, pellets of titanium, or other substances.

The question that has been intensely researched is how to purify and/or maintain the purity of a plasma. In this context, purity generally refers to a plasma composed solely of hydrogen, rather than a mixture of hydrogen and other (impurity) substances. The art of tokamak operation has progressed to the point where unwanted substances can be removed at will. On the other hand, ensuring the presence of conventionally undesirable substances is no problem to those skilled in the art.

Two methods to be used in conjunction with the oscillation of $Z_{eff}$ rely either on fast suprathermal electron currents or on oppositely drifting ions with disparate ionic charge states. Examples of the first category include current generation by means of lower hybrid waves or by means of electron cyclotron waves, generators 28, 26 respectively, of FIG. 1. The nonohmic efficiency for those means is given by the proportionality relation $$\frac{J}{P_d} \alpha \frac{1}{5 + Z_{eff}}, \quad (9)$$

so that increasing the effective ion charge state from unity to some value $Z_{eff}$ during the current generation cycle decreases the nonohmic efficiency according to $$\left(\frac{J}{P_d}\right)_g = \left(\frac{J}{P_d}\right) Z_i = 1 \frac{6}{5 + Z_{eff}} \quad (10)$$

On the other hand, unity ion charge state during the relaxation cycle implies $\tau_r/\tau_g = Z_{eff}$, so that using Eq. (8), the following results:

$$\left\{\frac{J}{P_d}\right\} = \left(\frac{J}{P_d}\right) Z_i = 1 \frac{6 Z_{eff}}{5 + Z_{eff}}, \quad (11)$$

which represents a maximum increase in efficiency by a factor of six. The maximum increase is obtained in the limit as $Z_{eff}$ approaches infinity. Explanation of how both lower hybrid waves and electron cyclotron waves must be applied to a plasma and how they affect the plasma so as to produce current is found in U.S. Pat. No. 4,292,124, issued Sept. 29, 1981 to N. J. Fisch; in U.S. Pat. No. 4,425,295, issued Jan. 10, 1984 to Nathaniel J. Fisch and Allen H. Boozer; in Nathaniel J. Fisch and Allen H. Boozer, Phys. Rev. Lett. 45, 720 (1980) (this reference discusses ECRH techniques), in Start et al, Phys. Rev. Lett. 48, 624 (1982); and in U.S. Pat. No. 4,423,001, issued Dec. 27, 1983 to N. J. Fisch. Background for these techniques is found in the articles by Brambilla, Proceedings of the Third Symposium on Plasma Heating in Toroidal Devices, Varenna-Como, Italy, Editrice Compositori, Bologna, 1976, p. 83; and by Ott et al (Phys. Fluids, 23 1031, 1980). The method of injecting lower hyhybrid waves and electron cyclotron waves in an oscillatory fashion so as to be in synchronism with other oscillating parameters will be readily apparent to those skilled in the art.

Examples of the second category of nonohmic current drive mechanisms utilized in conjunction with the oscillation of $Z_{eff}$ include techniques for producing counterstreaming (majority and minority) ions of disparate ionic charge states in the plasma, such as direct production by neutral beams or more circuitous production by minority species heating. Explanation as to how both neutral beams and minority species heating must be applied to a plasma so as to produce counterstreaming ions of disparate charge states, and how such counterstreaming ions affect the plasma, so as to drive current is found in Hosea et al, Phys. Rev. Lett. 43, 1802, (1979); in Ohkawa, J. Nuc. Fus., 10, 185, (1970); in Nathaniel J. Fisch, J. Nuc. Fus. 21 15, (1981); and in the aforementioned U.S. patent application Ser. No. 233,297, by Nathaniel J. Fisch, filed Feb. 9, 1981. The methods of cycling neutral beams and minority species heating and therefore methods of cycling the current drive will be readily apparent to those skilled in the art. The following discussion refers to the indirect technique wherein the direct technique will become readily apparent to those skilled in the art.

If a minority ion current $J_\alpha$ is established in a plasma by any means, then the bulk electrons and ions will respond such that the total current will obey $$J = J_\alpha(1 - Z_\alpha/Z_i),$$

where $Z_\alpha$ and $Z_i$ are, respectively, the minority and majority ion charge states. When the minority drift is caused by the preferential heating of minority ions traveling in one toroidal direction, then the unnormalized efficiency may be written approximately as $$\frac{J}{P_d} = \frac{3e}{v}\left(\frac{Z_\alpha}{m_\alpha}\right)\left(1 - \frac{Z_\alpha}{Z_i}\right)\frac{\nu_i}{(\nu_e + \nu_i)^2}, \quad (13)$$

where $m_\alpha$ is the minority ion mass and $\nu_i$ and $\nu_e$ are the collision frequencies of resonant minority ions traveling at velocity v and colliding, respectively, with the majority ions and electrons. The frequency of collision with the electrons is independent of v, but $\nu_i$ will scale as $1/v^3$.

The maximization of $J/P_d$ will depend on $Z_\alpha$, $Z_i$ and the resonant velocity v. Since $\nu_i$ is the most rapidly varying function of v, the maximization of $J/P_d$ must occur when $\nu_i(v) \simeq_e$, which approximately fixes v. Adopting then the partial optimization $\nu_i = \nu_e$, noting that $\nu_e$ is proportianal to $Z_\alpha^2$, and recognizing that $Z_\alpha/m_\alpha$ is relatively constant for most isotope choices, we reduce our problem to the maximization of the quantity Q, which is defined:

$$Q = |1 - Z_\alpha/Z_i|/Z_\alpha^2. \quad (14)$$

For $Z_\alpha > Z_i$, the local maximum $Q = \frac{1}{4}$ is attained when $Z_i = 1$ an $Z_\alpha = 2$. This represents an eminently practical approach since a $^3$He minority species in a deuterium or a deuterium-tritium plasma is plausible for first generation tokamak reactors. Note, however, that a greater efficiency is obtained when $Z_\alpha = 1$, where $Q = 1$ is attained in the limit of large $Z_i$. This approach is, however, a less likely candidate for D-T reactors.

When oscillations in $Z_{eff}$ are allowed, the disparity in the efficiencies of the two approaches become greater. In the high-$Z_\alpha$ approach, maximizing for $Z_\alpha$ gives $Z_\alpha = 2Z_i$, which means that Q scales as $1/Z_i^2$. Thus, increasing $Z_i$ has such a large deleterious effect on the steady state efficiency, $J/P_d$, that is completely outweighs any benefits that might be associated with the $\tau_r/\tau_g$ factor in Eq. (8).

In contrast, oscillating $Z_i$ for the case $Z_i > Z_\alpha$ can be quite advantageous. Taking $Z_i \gg Z_\alpha = 1$ during the generation cycle yields a value of $J/P_d$ which can be up to four times greater than what is possible when $Z_\alpha Z_i$. If during the relaxation cycle, $Z_1$ is reduced to unity, then we have $\tau_r/\tau_g = Z_i$. Thus, by Eq. (8) the quantity $<J/P_d>$ can be up to $4Z_i$ times its maximum when $Z_\alpha > Z_i$.

Although the case $Z_i >> Z_\alpha$ gives a higher current drive efficiency, especially with the subsequent reduction of $Z_i$ during the relaxation cycle, the engineering ramifications of this mode of operation impinge upon many other aspects of tokamak physics. For example, in order to present a uniform heat flux to the reactor blanket and first wall, it may be desired to operate the tokamak in a reactor regime during the generation cycle as well as during the relaxation cycle. An interesting possibility, therefore, in view of the presence in any case of high-$Z_i$ majority ions and $Z_{60} = 1$ minority ions, is to exploit the $^{11}$B-p fusion reaction (i.e. involving $^{11}$B majority ions and proton minority ions). During the relaxation cycle, the hydrogen and boron could be replaced by reacting low-$Z_i$ ions, such as deuterium and tritium. This "hybrid reactor" would not be a likely candidate for the first generation of fusion reactors because very high temperatures are required. For the first generation, other, less exotic means of equalizing the heat flux, if necessary, would be sought.

In general, the majority ionic charge state of the plasma is chosen to be substantially greater than one, and counterstreaming ions of disparate charge state are created utilizing neutral beam injection or minority species heating techniques, for example. The ionic charge state of the counterstreaming ions is less than the majority ionic charge state of the plasma. After the generation period is terminated, the plasma is swept out, and a plasma having a substantially lower average ionic charge state is introduced into the plasma device, such that the plasma of the relaxation period is characterized by an average ionic charge state that is lower than that of the generation period.

In addition to increasing the average ionic charge state, $Z_{eff}$, plasma resistivity may be increased, according to the invention, by decreasing temperature. Methods of controlling the temperature have heretofore focused on methods of increasing the temperature; the desirable operating point generally considered to be high density, high purity and high temperature. Degraded conditions such as low density, low purity or especially low temperature are easily attained by failing to employ those devices that lead to the more generally desirable operating conditions.

High temperature is attained as follows: first, energy may be brought into the plasma in one of two ways; energy is either injected into the plasma from outside the plasma by means of auxiliary power sources such as generators 16, 26, 28, 30 of FIG. 1, or the energy may be created within the plasma by means of energetic alpha particles that are products of fusion reactions within the plasma. Second, plasma energy must be well confined, i.e. it should not be quickly radiated, convected, or conducted away. Therefore, all plasma constituents should be fully ionized to decrease radiation, and inhomogeneities, or ripples in the magnetic field should be minimized. For internal alpha particle heating, the plasma constituents must themselves be fusion reagents. Therefore, in oder to have low plasma temperature during the current generation stage, but high temperature in the current relaxation state, any or all of the following may be done: the auxiliary heating (systems 16, 26, 28, 30 of FIG. 1) may be applied only during the relaxation stage; high atomic number impurities that will only partially ionize may be introduced via 14, 16, 18 only during the generation stage to radiate energy; the plasma confinement may be degraded during the generation stage so that energetic plasma particles are lost; or the production of alpha particles within the plasma may be minimized during the generation stage through the choice of plasma composition and density.

In general, degraded plasma conditions with regard to purity, density, temperature etc., are easily and quickly attainable either through the failure to employ techniques that have been designed to achieve heretore optimum conditions, or through the purposeful introduction of impurities and other heretofore undersirable features.

Before setting forth an example of the preferred embodiment, salient features of the invention will be summarized. Through oscillation of plasma resistivity, alone or in conjunction with an oscillation of plasma density, the system according to the invention increases the quantity $J/P_d$, the ratio of overall toroidal current generated, to the current-driving dissipation power. Oscillation of the plasma parameters are synchronized with the generation period. In FIG. 1, control unit 2 is connected to the various systems for cycling plasma resistivity as well as the various nonohmic current drive systems (e.g. fast suprathermal techniques, Whistler-Alfven techniques, as well as ICRF, ECRF, and LHW techniques) so as to provide synchronism therebetween, as required by the present invention. In accordance with the aforementioned Eq. (8), which is based upon several operating and simplifying assumptions, the invention increases the current-to-dissipation power ratio by reducing the quantity $\tau_g$, the L/R time constant of the toroidal plasma during the generation period (the L/R time constant may assume a different value during the relaxation period). More specifically, $\tau_g$ (the ratio of toroidal inductance to plasma resistivity) is minimized by increasing plasma resistivity) during the generation cycle.

Resistivity is increased, in a first manner, by increasing the parameter $Z_{eff}$ during the generation period. Two methods of generating current in conjunction with the increase in $Z_{eff}$ in an oscillatory fashion during the generation period include: the generation of fast electron currents in the plasma by either lower-hybrid waves (LHW) or by electron cyclotron waves (ECRF); or, alternatively, counterstreaming ions of disparate charge states are introduced into the plasma utilizing neutral beam techniques, or minority species heating.

Modification of the plasma parameters during pulsed nonohmic current-drive also affects the quantity $(J/P_d)_g$. While increases in plasma resistivity tend to cause this term to decrease, a judicious choice of nonohmic current-drive may limit the decrease to an insignificant amount. For example, the current-drive technique should push fast electrons, rather than slow electrons. That is, either lower hybrid or electron cyclotron wave techniques, which push fast suprathermal electrons, should be employed, rather than Alfven wave techniques, which push slow electrons. Accordingly, when the proper electrons are pushed, the net effect of the invention is to increase the quantity $<J/P_d>$.

In addition to the modification of $\tau_g$ through an increase in resistivity, the invention also includes an option of additionally decreasing the plasma density during the generation period. The decrease in density does not affect $\tau_g$, but it does increase the quantity $(J/P_d)_g$, which is inversely proportional to plasma density.

An example according to the invention illustrates the simultaneous oscillatory modification of several plasma parameters, in a reactor-size tokamak. The tokamak in this example has a three meter minor radius and an eight meter major radius. In its normal operating range, (i.e. during the relaxation period), its plasma density is $n = 10^{14}$ cm$^{-3}$, average ionic charge state $Z_{eff} = 1$, and plasma temperature $T = 15$ keV. The ions are a 50/50 D-T mixture. The reactor fusion output during the relaxation period will be about 2.6 GW. The current required for confinement is about 8 MA. If this tokamak were to be operated in the completely steady state utilizing lower-hybrid wave current-drive, then continuous rf power $P_d$ of 150 MW would be required. For this tokamak, the present invention contemplates a generation period wherein $n = 10^{13}$ cm$^{-3}$, $T = 1$ keV, and a 50% neon impurity concentration giving $Z_{eff} = 4\frac{1}{2}$. The plasma L/R time during this period, $\tau_g$, is about 15 sec. Applying about 30 MW of lower-hybrid power for 15 seconds should be sufficient to bring the plasma current to the required 8 MA. At that point, the neon impurity is pumped out through divertors or pump limiters, and deuterium and tritium are either gas-puffed or injected in the form of frozen pellets, bringing the now almost pure D-T mixture to the relaxation density. This process should take a few seconds.

As the density rises, so does the energy confinement time and the number of fusion reactions, leading to plasma heating through the energetic alpha particles. The combined effect of increased heating and confinement time leads to an increased temperature. The lower-hybrid power may also be utilized at this point of reactor operation to bring the plasma to ignition and to obtain the temperature range contemplated in the relaxation period. When ignition is achieved, the lower hybrid power is shut off.

The L/R time in the relaxation period is about 1,500 seconds so that this process need not be repeated for a like period. The energy savings may now be computed. In the completely steady state case, about 150 MW are applied for the full 1,500 seconds, or about 200 gigajoules (GJ) are expended in this time. In the oscillatory case described above, 50 megawatts are expended for about 20 seconds and none in the remaining 1,480 seconds, for a total of only one GJ for the full 1,500 seconds. The fusion output on the other hand, is roughly the same as that without benefit of the invention.

As an alternative to the above, the time constants $\tau_g$ and $\tau_r$ are shortened, but are maintained in the same proportion to each other. Of course, $\tau_g$ cannot be shortened to the point where the ability to change plasma parameters in a time much shorter than $\tau_g$ is rendered impossible. The advantage of short $\tau_g$ and $\tau_r$ time constants is that the total swing in the plasma current is less, although the swings in the other plasma parameters are the same.

The above can be used equally well with Electron Cyclotron Resonance Heating or fast-wave current drive instead of Lower Hybrid current drive.

The following modifications to the above example provide for the use of nonohmic current-drive of the counterstreaming-ion type. The simultaneous oscillation of several plasma parameters is incorporated in the following counterstreaming ion current-drive example. The plasma container and plasma conditions during the relaxation stage are as characterized during the previous example. However, during the generation period, the present illustrative example contemplates a density $n = 10^{12}$ cm$^{-3}$, $T = 10$ Kev, and an approximately 90% neon plasma giving $Z_{eff} \approx 8$. The plasma L/R time during this period is about 200 seconds. The current is driven by neutral beams of hydrogen or alternatively through the selective heating of a hydrogen minority species, which comprises about 10% of the total plasma. Approximately 5 MW of neutral beam or rf power for the 200 seconds should suffice to drive the required 8 MA of toroidal current during the generation phase. When the current is brought up to 8 MA, the neon is pumped out as in the above example and deuterium and tritium are injected as above. The plasma is then brought to conditions characteristic of the relaxation plasma. The total current-drive energy expended, about 5 MW for 200 seconds, comes to 1 GJ per complete cycle as in the above example.

An alternative with interesting possibilities is to use $^{11}$B instead of neon since $^{11}$B (boron eleven) is a fusion reagent when mixed with hydrogen at high temperatures. Accordingly, an energetic hydrogen beam could both drive current and produce enough heat from fusion during the generation stage, that the plasma heat generated will be sufficient to maintain the plasma container at sufficiently constant temperature over the full cycle. Thus, metal fatigue that might arise when the container is exposed to variations of temperature is avoided.

Further description of the invention will now be made with reference to FIG. 1, wherein a schematic representation of a toroidal confinement device 10 and various auxiliary systems 14–32 for cyclically increasing plasma resistivity during the generation period, will be described. Lower hybrid wave generator 28 launches lower hybrid waves into the toroidal plasma so as to generate a plasma current. Alternatively, electron cyclotron resonance generator 26, or ion cyclotron resonance generator 30 is employed to launch electron cyclotron resonant waves into the toroidal plasma 12 so as to generate the required plasma current.

Means of increasing plasma resistivity by cyclically increasing the average ionic charge state $Z_{eff}$ is shown in FIG. 1 as a pellet source 18 which injects frozen neutral pellets into the plasma, creating in a known manner, a counterstreaming minority ion flow.

Yet another means of generating a plasma current, to be used in conjunction with cyclically increasing plasma resistivity by cyclically increasing the average ionic charge state $Z_{eff}$ is schematically illustrated in FIG. 1 by minority species heating system 32 which selectively heats plasma minority species, so as to create a counterstreaming minority ion flow in the toroidal plasma.

As an alternative to increasing plasma resistivity through an increase an average ionic charge state $Z_{eff}$, plasma resistivity may be cyclically increased during the plasma generating period through a cyclic decrease in plasma temperature T. Plasma temperature is decreased by reducing external plasma heating power injected into the plasma during current generation (i.e. systems 14, 16, 18, 26, 28, 30 are synchronized by control unit 2). Alternatively, nonionizable or partially ionizable hi-Z matter can be injected into the plasma (via systems 14, 16, 18) during current generation, with this matter being removed (via systems 20, 22) during the relaxation period, as synchronized by control unit 2.

Figure 2:
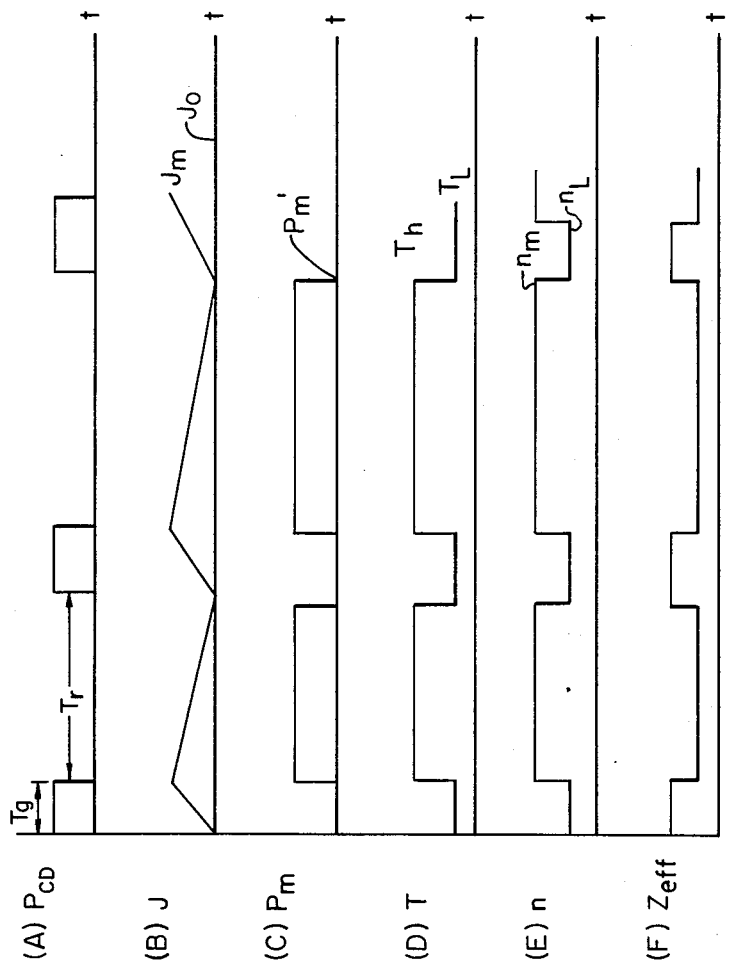
FIG. 2 depicts, in graphical form, typical toroidal device operation utilizing the method of the present invention.

FIGS. 2a–2f are timing diagrams representing in graphical form toroidal device and control unit 2 operation according to the invention, setting forth $P_{cd}$, J, $P_m$, T, n, and $Z_{eff}$ as functions of time, respectively. FIG. 2a shows the application of current generation power $P_{cd}$ as a function of time, wherein $T_g$ and $T_r$ are the generating period and recovery period times set forth above. With reference to FIG. 2a, current driving power $P_{cd}$ is fully applied during time $T_g$ and is fully shut off during recovery time $T_r$. With reference to FIG. 2b, plasma toroidal confining current J is shown increasing during application of current driving power $P_{cd}$, i.e., the period $T_g$, and decaying during the relaxation time $T_r$. In FIG. 2b, $J_0$ represents the minimum value of toroidal current which is attained at the end of each relaxation cycle (see equation (5) where $J_0=J(0)$), and $J_m$ represents the maximum driving current obtained at the end of the impulsive application of current driving power $P_{cd}$.

In FIG. 2c, $P_m$ represents an optional source of additional plasma heating power wherein $P_m$ is reduced to a minimum value Pm' during the current generation period $T_g$, so as to create conditions for maximizing plasma temperature during the relaxation cycle. Alternatively, Pm may represent the increase in internal heating of the plasma by virtue of fusion reactions, which heating occurs synchronously with the optimization of parameters for fusion production. FIG. 2d shows plasma temperature T as a function of time wherein plasma temperature T is reduced to a minimum value $T_L$ during current generation period $T_g$, and is thereafter allowed to rise to a value $T_m$ in between impulsive applications of current driving power $P_{cd}$. With reference to FIG. 2e, plasma density n is decreased to a minimum value $n_L$ during the generation period $T_g$, with the plasma density being allowed to resume a higher maximum value $n_M$ during the recovery period $T_r$. FIG. 2f shows the oscillations in average ionic charge state $Z_{eff}$.

It should be noted that the present invention can be used also in conjunction with the conventional ohmic-drive Tokamak, particularly to assist the start-up operation. Conventional ohmic-drive tokamaks consume a large fraction of their transformer volt-seconds during the start-up or initial plasma-building stage of operation, when the plasma is less dense and less hot than the subsequent stage of operation, as the parameters are brought to optimal values. Accordingly, the present invention is suited to assist the ohmic-drive by maintaining the plasma current during this inital phase. During low density phase operation, when ohmic drive efficiencies are low, a preferred mode of start-up utilizes the non-ohmic oscillatory techniques of the present invention (as set forth above) to raise plasma resistivity to a heretofore unfavorable high level (or, looking at it in a different way, delaying the decrease of plasma resistivity) so as to more rapidly bring plasma current to an elevated value, and to a plasma condition in which ohmic drive techniques are more efficient. Thereafter, ohmic current drive energizes the plasma for as long a period as is possible, whereupon the plasma is swept out ending the "cycle" of operation. The nonohmic current drive techniques preferably include fast suprathermal electron energization, but may also include any of the ionic energization techniques described above.

The embodiments of the invention in which an exclusive property or privilege is claimed are defined as follows:

1. A system for maintaining a steady-state toroidal current for magnetically confining, in a toroidal magnetic plasma device, a toroidal plasma having a density, temperature, resistivity, purity, average ionic charge state, inductance L, ressitivity R, and an electrical time contant $\tau = L/R$, the system comprising:

pulsed nonohmic current drive means, which includes a first source of external energy, for cyclically energizing said plasma so as to drive, over a plurality of cycles, a toroidal current therethrough, wherein each cycle consists of a generation period during which said first source applies external energy to the plasma so as to drive said toroidal current therethrough, and a relaxation period during which the application of said external energy is ceased and said toroidal current is allowed to decay; and means for oscillating the plasma resistivity by cyclically degrading the plasma during said generation period of said pulsed nonohmic current drive cycle so as to minimize said toroidal electrical time constant during said generation period to thereby minimize the power required to provide a steady-state toroidal confining current during the overall current drive cycle.

2. The arrangement of claim 1, wherein said plasma resistivity oscillating means comprises first means for cyclically decreasing the plasma temperature during said generation period, and means for removing said first means so as to allow said plasma temperature to rise during said relaxation period.

3. The arrangement of claim 1 wherein said plasma resistivity oscillating means comprises:

a second external energy source for cyclically increasing the plasma temperature during said relaxation period by energizing fast superthermal electrons during said relaxation period; and means for ceasing the application of said second source external energy during said generation period so as to allow said plasma temperature to fall during said generation period.

4. The arrangement of claim 1 further comprising means for oscillating the plasma density such that the plasma density is increased during said relaxation period and decreased during said generation period.

5. The arrangement of claim 2 wherein said first means comprises means for injecting high atomic number, partially ionizable impurities into said plasma during said generation period so as to cause a radiation of plasma energy away from said plasma, said first means further including means for removing said impurities from said plasma during said relaxation period.

6. The arrangement of claim 2 wherein said first means comprises means to degrade said plasma confinement so as to allow the escape of energetic plasma components from said plasma during said generation period.

7. The arrangement of claim 2 wherein said first means comprises means for minimizing alpha particle production within said plasma.

8. The arrangement of claim 1, wherein said plasma resistivity oscillating means comprises second means for increasing the plasma average ionic charge state during said generation period by introducing into said plasma during said generation period, matter having an ionic charge state different from that of said plasma so as to increase the effective ion charge state of said plasma during said generation period, said matter becoming a plasma component during said generation period, said second means further comprising means for removing said matter from said plasma during said relaxation period so as to allow said plasma average ionic charge state to decrease during said relaxation period.

9. The arrangement of claim 8 wherein said plasma has a predetermined value of effective ion charge state during said relaxation period, wherein said second means comprises means for injecting high atomic number impurities into said plasma during said generation period so as to increase the effective ion charge state of said plasma to a value higher than that of said predetermined value and wherein said pulsed nonohmic current drive means comprises means for launching traveling waves of one of said lower hybrid wave, Whistter-Alfven wave and electron cyclotron wave types into said plasma so as to energize fast, suprathermal electrons in said plasma.

10. The arrangement of claim 8 wherein said matter is injected into said plasma as one of said neutral beam and frozen pellet forms.

11. The arrangement of claim 8 wherein said matter comprises a plasma impurity produced by operation of said toroidal plasma device during generation period, and said second means comprises means for preserving said plasma impurity during said generation period.

12. The arrangement of claim 1 wherein said plasma is characterized during said generation period by a majority ionic charge state substantially greater than one and by a first average ionic charge state;
said pulsed nonohmic current drive means comprises one of said neutral beam injection and minority species heating means for generating in said plasma counterstreaming ions of disparate charge states, said counterstreaming ions having an ionic charge state less than the majority ionic charge state of said plasma; and
said arrangement further comprises means for evacuating said plasma upon termination of said generation period and introducing plasma of a substantially lower average ionic charge state such that said plasma is characterized during said relaxation period by a second lower average ionic charge state.

13. The arrangement of claim 12 wherein said plasma comprises $^{11}B$ majority ions and proton minority ions, and wherein fusion energy is produced during said generation period so as to partially reduce a heat flux variation of said toroidal magnetic plasma device.

14. A method for maintaining a steady-state toroidal current for magnetically confining, in a toroidal magnetic plasma device, a toroidal plasma having a density, temperature, resistivity, purity, average ionic charge state, inductance L, resistivity R, and an electrical time constant $\tau = L/R$, the method comprising:
cyclically energizing said plasma with pulsed nonohmic current drive means so as to drive, over a plurality of cycles, a toroidal current therethrough, wherein each cycle consists of a generation period during which external energy is applied to the plasma so as to drive said toroidal current therethrough, and a relaxation period during which the application of said external energy is ceased and said toroidal current is allowed to decay, and
oscillating said plasma resistivity by cyclically degrading the plasma during said generation period of said pulsed nonohmic current drive cycle so as to minimize said toroidal electrical time constant during said generation period to thereby minimize the power required to provide a steady-state toroidal confining current during the overall current drive cycle.

15. The method of claim 14 wherein the step of oscillating said plasma resistivity comprises cyclically decreasing said plasma temperature during said generation period and allowing said plasma temperature to rise during said relaxation period.

16. The method of claim 15 wherein an auxiliary heating source energizes said plasma and said cyclical decrease in said plasma temperature during said generation period includes the step of ceasing the application of external energy from said nonohmic current drive means to said plasma during said generation period.

17. The method of claim 15 wherein said step of cyclically decreasing the plasma temperature during said generation period includes injecting high atomic number, parial partially ionizable impurities into said plasma during said generation period so as to cause a radiation of plasma energy away from said plasma, and wherein said step of allowing said plasma temperature to rise during said relaxation period comprises the step of removing said impurities from said plasma during said relaxation period.

18. The method of claim 15 wherein said means for cyclically decreasing the plasma temperature during said generation period comprises the step of minimizing alpha particle heating of said plasma during said generation period.

19. The method of claim 14 wherein the step of oscillating said plasma resistivity comprises the step of increasing the plasma average ionic charge state during said generation period by introducing into said plasma during said generation period, matter having an ionic charge state different from that of said plasma so as to increase the effective ion charge state of said plasma during said generation period, said matter becoming a plasma component during said generation period; and by removing said matter from said plasma during said relaxation period so as to allow said plasma average ionic charge state to decrease during said relaxation period.

20. The method of claim 19 wherein the step of introducing matter into said plasma during said generation period comprises injecting matter into said plasma as one of said neutral beam and frozen pellet forms.

21. The method of claim 14 including the sequence of steps comprising:
cyclically energizing said plasma with an ohmic current drive means during said relaxation period so as to substantially prolong said relaxation period;
thereafter ceasing all energization of said plasma, and removing said plasma from said toroidal magnetic plasma device; and
thereafter reintroducing said plasma in said toroidal magnetic plasma device and energizing said plasma during a subsequent generation period with said pulsed nonohmic current drive means so as to prepare said plasma for the step of energization by said ohmic current drive means during a subsequent relaxation period.

22. The method of claim 14 further comprising oscillating the plasma density such that the plasma density is increased during said relaxation period and decreased during said generation period.

* * * * *